United States Patent [19]

Klapperich

[11] Patent Number: 5,407,306
[45] Date of Patent: Apr. 18, 1995

[54] JIG FOR BORING DOWEL HOLES IN TRUE ALIGNMENT WITH EACH OTHER

[76] Inventor: Leo Klapperich, Im Kühlstiefel 21, D-56653 Wehr, Germany

[21] Appl. No.: 111,695

[22] Filed: Aug. 25, 1993

[30] Foreign Application Priority Data

Aug. 26, 1992 [DE] Germany .................. 42 28 285.3

[51] Int. Cl.⁶ ............................................. B23B 49/00
[52] U.S. Cl. ........................................... 408/115 R
[58] Field of Search ............... 408/97, 103, 115 R, 408/115 B

[56] References Cited

U.S. PATENT DOCUMENTS

| | | | |
|---|---|---|---|
| 3,775,020 | 11/1973 | Stoutenberg | 408/115 R |
| 4,176,989 | 12/1979 | Wolff | 408/115 R |
| 4,594,032 | 6/1986 | Warburg | 408/115 R |
| 4,602,898 | 7/1986 | Brown et al. | 408/115 R |
| 4,834,593 | 5/1989 | Fallon | 408/115 R |

FOREIGN PATENT DOCUMENTS

| | | | |
|---|---|---|---|
| 3020970 | 12/1981 | Germany | 408/115 B |
| 2120584 | 12/1983 | United Kingdom | 408/103 |

*Primary Examiner*—Daniel W. Howell
*Attorney, Agent, or Firm*—Anderson Kill Olick & Oshinsky

[57] ABSTRACT

The invention is directed to a jig for boring doweling holes into alignment with one another in two boards or the like to be connected with one another by dowels or pegs and adhesives or bonding, comprising a plate which can be placed upon the board to be drilled, said plate comprising at least one guide hole for a drill and an adjustable and removable stop. In order to achieve elimination of the hitherto required insertion and removal of the dowels or pegs into or from the dowel holes of a board for positional determination of the bores in the second board, a displaceable or adjustable centering pin 14 probing the dowel hole 16 of the already drilled board 1 in an aligned manner is allocated to the guide hole 9.

7 Claims, 1 Drawing Sheet

JIG FOR BORING DOWEL HOLES IN TRUE ALIGNMENT WITH EACH OTHER

FIELD OF THE INVENTION

The present invention deals with a jig and more particularly to a jig, for boring dowel holes in true alignment with one another in two boards or the like, connectable with one another by dowels pegs and adhesives.

BACKGROUND OF THE INVENTION

DE-PS 27 50 868 discloses a so-called auxiliary tool for boring dowel holes in boards which are to be connected to each other by dowels or pegs when in end face planar contact. The auxiliary tool comprises a plate placeable upon the board to be drilled and at least one guide hole for a drilling tool bit has been worked into this plate. A dowel engagement portion is allocated to each guide hole, which comprises a planar board contact face parallel to the central axis of the guide hole and at least one peg engagement slot open towards the board contact face. Herein, the internal width of the dowel or peg engagement slot is configured to be equal to the diameter of the guide hole. Finally, the central axes of the dowel engagement slot and the guide hole lie in a common plane perpendicular to the board contact.

Such an auxiliary tool is handled with the board, which has to be drilled on its end face and is provided with a quantity of holes which must not have an accurately predetermined spacing from one another. Dowels or pegs are temporarily installed in all dowel holes drilled into this board. Subsequently, this board, provided with dowel holes and dowels, is clamped snugly to the other undrilled board in a workbench or the like. The auxiliary tool is placed in such a way upon the boards, that the dowel engagement portion, with its dowel engagement slot, embraces a dowel or peg protruding from the dowel hole. The guide hole or the drilling bit, allocated to the dowel engagement slot, is brought into such a position, that an extremely accurate alignment of the dowel holes in both boards receiving a dowel or peg is assured. After the position of all dowels inserted into a board has been probed in this way and the matching aligned holes have been drilled in the other board, all the dowels or pegs inserted into the dowel holes of the one board are again removed. After that there follows the usual connection of both boards by adhesive or bonding, wherein one dowel or peg projects into the aligned dowel holes of the two boards to be connected with one another.

The known auxiliary tool requires the dowel or peg to always be inserted into the matching dowel hole of the first board which, prior to connecting both boards by adhesion or bonding must again be removed, in order to produce an aligned dowel hole in the second board. This is not only cumbersome, but also time consuming. This additional work is required for each aligned pair of dowel holes, wherein at least two dowels for the corresponding dowel holes must be used in the region of two boards to be connected with each other by doweling or pegging and said adhesion or bonding. Furthermore, if the dowel or peg is not manufactured with great accuracy and inserted into the dowel hole under stress, it can be damaged or even destroyed if it is pulled out of the dowel holes. If clearance or play exists between the dowels or pegs and the dowel bore in the first board, positional accuracy of the dowel holes in the second board is greatly impaired. The previously known auxiliary tool is limited to a maximum of three guide holes because of the upright lugs for alignment of the guide hole to the end face of a board. If guide holes with another diameter are required, another auxiliary tool must be used.

It is therefore an object of the invention to provide a jig for boring of dowel holes in true alignment with one another in two boards or the like to be connected by dowels or pegs and adhesion or bonding.

Another object of the invention is to provide a jig where a required insertion and removal of pegs into the dowel holes of a board for positional determination of the bores in the second board is no longer necessary.

SUMMARY OF THE INVENTION

These and other objects of the invention, which shall become hereafter apparent, are achieved by a jig for boring dowel holes in true alignment with each other, having a displaceable centering pin probing a dowel hole in the already drilled board in an aligned manner and allocated to the guide hole. The centering pin, which can be reused, is used for determining the position of the guide hole for the drill in order to fabricate a dowel hole in the second board. The centering pin probes the true and accurate position of the corresponding dowel hole in the first board. This jig eliminates the insertion and subsequent removal of the dowels or pegs, reducing and simplifying the amount of work involved in the fabrication of dowel holes in true alignment with one another in two boards or the like which have to be connected with one another. The danger of damaging obstruction of dowels or pegs is excluded.

BRIEF DESCRIPTION OF THE DRAWINGS

The invention will be better understood by the Detailed Description of the Preferred Embodiment, with reference to the drawings, of which.

DETAILED DESCRIPTION OF THE PROFFERED EMBODIMENTS

Figure 1:
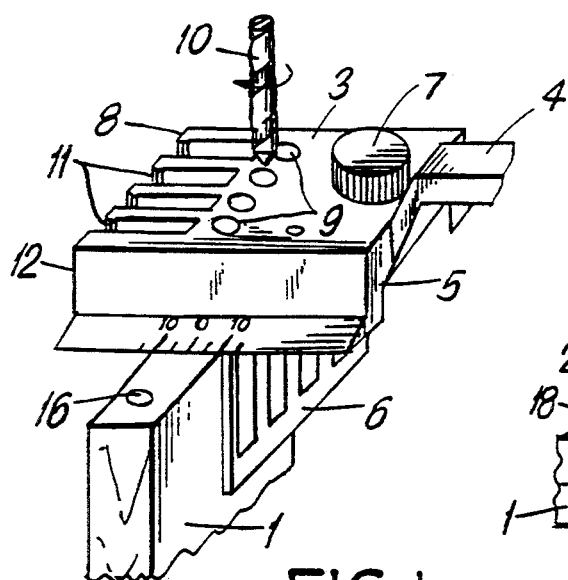
FIG. 1 is a perspective view of the end face of a board.

Referring now to the drawings, wherein like numerals show like elements, throughout the several views and embodiments FIGS. 1-5, depict a jig for drilling dowel holes, truly aligned with one another in two boards 1, 2, to be connected by pegs or dowels and adhesives. The jig comprises a plate 3, joined to a handle 4. In the jigs shown in FIGS. 1 to 4, the plate 3 has approximately square base surface. A guide 5, extending in direction of the handle 4, is provided at the bottom side of the plate 3 and has a stop 6. The stop 6 has an approximately angularly shaped cross-section, wherein one leg is retained to be displaceable in the guide 5 and can be fixedly clamped in adjustable positions by a screw 7, which is only outlined here. The stop extends at right angles relative to both side faces of the plate 3 and parallel relative to the front face 8 of the plate 3.

Four guide holes 9 for a drill 10, only outlined here, are shown in this embodiment in the plate 3. The holes 9 are spaced relative to the front face 8 and are disposed and aligned parallel to the front face 8 and have different diameters, for instance of 6 mm, 8 mm, 10 mm and 12 mm. The guide holes 9 extend through the entire plate 3 and precisely perpendicularly relative to the base surface of the same.

Guide slots 11 are provided between the front face 8 and the guide holes 9, whose central plane runs precisely in the middle axis of the guide holes 9. The guide slots 11 can correspond to the diameter of the respectively allocated guide holes 9. In the embodiment shown however, all guide slots 11 are of equal size. Two guide strips 12, 13, disposed at right angles to one another, are located at each side face of a guide slot 11. The guide strips 12, 13 are arranged on the side faces of a guide slot 11 and are located to be aligned opposite to each other and thus form a common guide. Respectively, one centering pin 14 can be moved on the guides formed by the guide strips 12 and 13, wherein the displacement of the centering pin 14 is always possible in only one direction, thus parallel or perpendicularly to the base surface of the plate 10.

Each centering pin 14, has a guidance portion 15, which is only outlined here, and which enables a displacement along the guide strips 12, 13. The centering pin proper follows upon this guidance portion 15. The pin 14 is cylindrical in the embodiment in FIGS. 1 to 4 and can be provided with a chamfer at its free end. If necessary, a centering pin 14 can be provided on both sides of the guide portion 15, wherein these two centering pins 14 have different diameters.

This jig is now utilized according to FIG. 1 for manufacturing dowel holes 16 in the end face of the board 1. Herein, the plate 3 is oriented in such a way on the end face of the board 1 by the stop 6, such that the guide holes 9 are located centrally above the end face of the board 1. A drill 10 is selected which corresponds to the diameter of the dowel hole to be produced. The drill 10 is lowered through the appropriate guide hole 9 and the dowel bore is drilled at a precisely predetermined spot.

Figure 2:
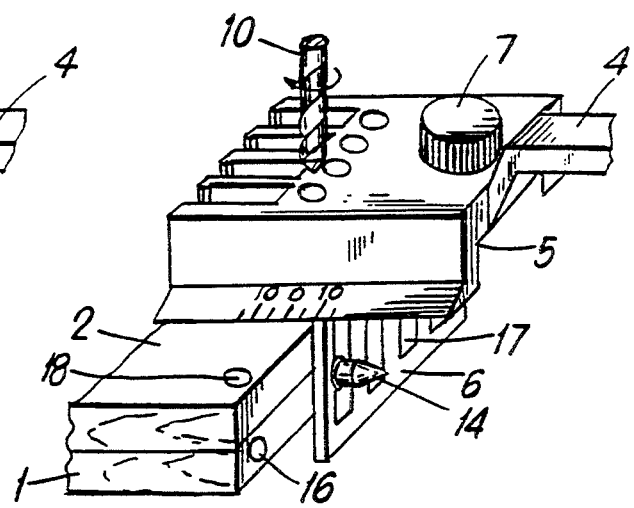
FIG. 2 is a perspective view of the jig in FIG. 1 on two superimposed boards.

When all doweling holes 16 have been placed in this end face of the board 1, the jig is removed from its position shown in FIG. 1. Now a second board is placed upon the board 1 already provided with dowel holes 16, as shown in FIG. 2 and is now clamped rigidly to the board 1. Guide slots 17 are now provided in the perpendicular portion of the stop 6 in the embodiment shown in FIGS. 1 and 2. The slots 17 are also aligned with the guide holes 9. The centering pin 14 is introduced now in such a way into the guide slot 17, allocated to the appropriate guide hole 9, that it can probe a dowel hole 16 with its cylindrical portion. As soon as the centering pin 14 is located in the doweling hole 16 of the board 1 and the stop 6 lies at the end face of both boards 1 and 2, an aligned dowel hole 18 can be drilled in the board 2 by the drill 10.

After all the doweling holes 18 have been manufactured in such a way in board 2, the two boards 1 and 2 can be connected with each other in a known manner by using pegs and adhesive.

Figure 3:
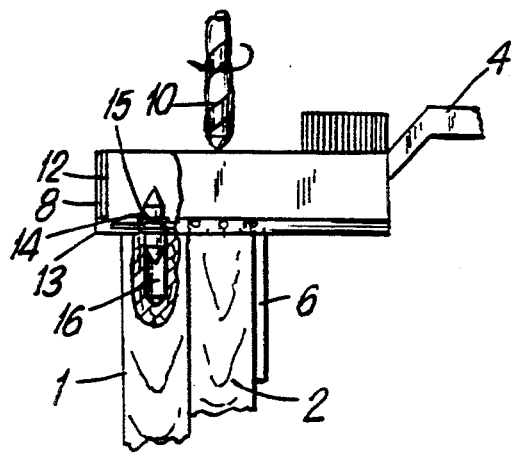
FIG. 3 is a side view of the jig in FIG. 1 on two upended boards.

The jig, shown in such a position in FIG. 3, shows that doweling holes can be drilled in the end face of the board 2. Here, the centering pin 14 extends into the guide slot 11 and protrudes into the dowel hole 16 of the Board 1. Now the corresponding dowel hole can be drilled in the end face of the board 2 in a position predetermined by the stop 6.

Figure 4:
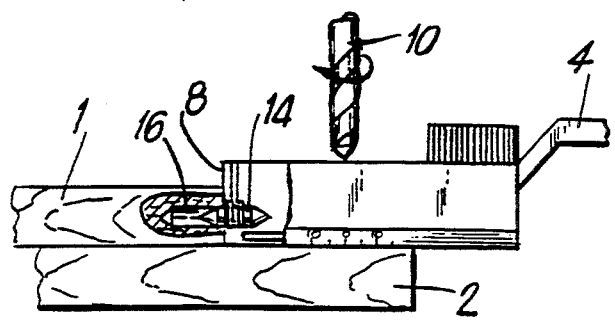
FIG. 4 is a side view of the jig in FIG. 1 in the area of the stagger of two superimposed boards.

FIG. 4 depicts the drilling of doweling holes in board 2, similar to FIG. 2. Here however, the jig lies with its front face 8 at the end face of the board 1, provided with dowel holes 16 and the centering pin 14 projects into a dowel hole 16. The board 2 is offset by a predetermined amount relative to board 1, so that the doweling holes 18, shown in FIG. 2, can be drilled in the board 2 by the drill 10 at the precisely predetermined points.

Figure 5:
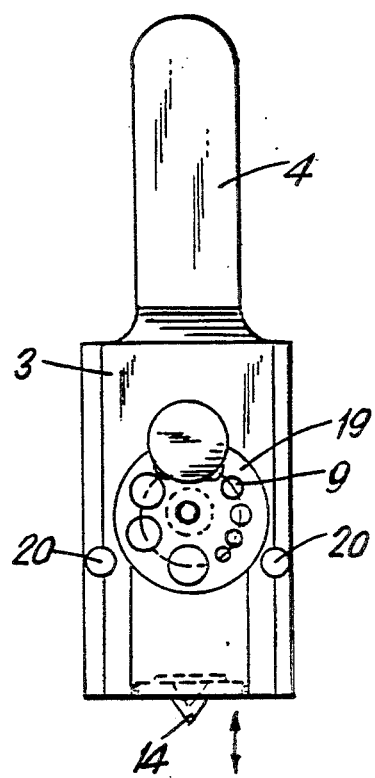
FIG. 5 is another embodiment of the jig according to the present invention.

In the embodiment of the jig shown in FIG. 5, the plate 3 is provided with a rotatable washer in which a plurality of guide holes 9 having different diameters has been formed. The guide hole 9, which is located on the longitudinal axis of the plate 3, closer to the front face of the plate 3 is used for guiding the drill 10 for boring the dowel hole. In order to produce the dowel hole 16 in the board 1, the plate 3 is equipped with two upright lugs 20 which helps orient the effective guide hole 9 to the center of the end face of the board 1 to be drilled. The centering pin 14, which in this case is designed as a resiliently supported cone-shaped pin, can additionally be moved perpendicularly to the base surface of the plate 3. With the centering pin 14, the jig shown in FIG. 5 can, with the help of the already drilled dowel hole 16, be oriented in the board 1 and the associated dowel hole 18 of the board 2 can be drilled in an aligned manner. It is also possible to displace the centering pin 14 in a plane parallel to the base surface of the plate 13. The jig in FIG. 5 can then be used similarly as that in FIG. 3. The cone-shaped design of the centering pin 14 provides the advantage that only one centering pin 14 is required for dowel holes 16 of different size, which however, in that case, must be supported so as to be resiliently displaceable in axial direction.

Evidently it is also possible in the jig of FIG. 5 to provide a stop at the bottom side or in the base surface of the plate 3, which, if necessary, can also accept centering pins 14 in guide slots 17, as shown in FIG. 2.

In deviation from the embodiment shown, it is possible to shape the guides for the centering pins 14 in a different manner. The guide strips 12, 13 can be replaced, for instance, by appropriately disposed guide grooves or the like. The plate 3, with handle 4 and the stop 6, can advantageously be fabricated from plastics material. The guide holes 9 are lined by metallic bushes, which enable a particularly good guidance of the respective drill 10. The centering pins 14 consist of especially wear resistant plastics material.

While the preferred embodiment of the invention has been depicted in detail, modifications and adaptations may be made thereto, without departing from the spirit and scope of the invention, as delineated in the following claims:

What is claimed is:

1. A jig for boring, in one of two boards to be connected to one another by one or more dowels and adhesive, dowel holes precisely aligned with respective dowel holes already formed in another of the two boards, said jig comprising:

a plate to be placed on said one of the two boards and having at least one guide hole for guiding a drill therethrough, and at least one guide slot associated with said at least one guide hole;

an adjustable centering pin, which is associated with said at least one guide hole and is received in said guide slot, for engaging an already formed dowel hole in said another of the two boards, with which a dowel hole to be formed in the one of the two boards should be aligned thereby to provide for precise alignment of the dowel hole to be formed in the one of the two boards with the already formed dowel hole in the another of the two boards; and two guide elements provided in said guide slot and offset one to another by 90°.

2. The jig of claim 1, further comprising a stop extending transverse to said plate and secured at a bottom surface thereof for positioning said jig relative to the boards, said stop including a guide slot corresponding to said guide slot in said plate.

3. The jig of claim 1, wherein said pin has a substantially cylindrical shape.

4. The jig of claim 1, wherein each guide element comprises one of two guide strips and two guide grooves arranged on opposite sides of the guide slot, respectively.

5. A jig for boring, in one of two boards to be connected to one another by dowels, dowel holes precisely aligned with respective dowel holes already formed in another of the two boards, said jig comprising:

a plate to be placed on the one of the two boards and having a plurality of guide holes for guiding a drill therethrough for enabling forming a corresponding plurality of dowel holes in the one of the two boards; and an adjustable centering pin associated with said plate and adapted to engage any of the already formed dowel holes of the another of the two boards, with which the dowel holes to be formed in the one of the two boards should be aligned, for placing said plate in a position in which a precise alignment of the dowel's holes to be formed in the one of the two boards with the already formed dowel holes in the another of the two boards is provided;

wherein said plate includes a rotatable washer, said plurality of guide holes being formed on a circular line of said rotatable washer.

6. The jig of claim 5, further comprising a stop extending transverse to said plate and secured to a bottom surface thereof for positioning of said jig relative to the boards, said stop having a slot for receiving said centering pin.

7. The jig of claim 5, wherein said centering pin has a cone-shaped cross-section and is resiliently supported in an axial direction.

* * * * *